United States Patent [19]

Harney

[11] Patent Number: 4,783,698

[45] Date of Patent: Nov. 8, 1988

[54] INTERPOLATOR FOR COMPRESSED VIDEO DATA

[75] Inventor: Kevin Harney, Brooklyn, N.Y.

[73] Assignee: Technology Inc., 64, Princeton, N.J.

[21] Appl. No.: 128,748

[22] Filed: Dec. 4, 1987

Related U.S. Application Data

[63] Continuation-in-part of Ser. No. 038,096, Apr. 13, 1987, abandoned.

[51] Int. Cl.$^4$ .............................................. H04N 7/12
[52] U.S. Cl. .................... 358/133; 358/166; 358/284; 358/138
[58] Field of Search ............. 358/133, 160, 140, 138, 358/21 R, 166, 280, 284; 364/723

[56] References Cited

U.S. PATENT DOCUMENTS

| | | | |
|---|---|---|---|
| 4,068,266 | 1/1978 | Liao | 358/280 |
| 4,127,873 | 11/1978 | Katagi | 358/166 |
| 4,303,947 | 12/1981 | Stoffel | 358/260 |
| 4,428,059 | 1/1984 | Gessert | 364/577 |
| 4,531,151 | 7/1985 | Hentschke | 358/135 |
| 4,654,695 | 3/1987 | Fling | 358/133 X |
| 4,677,405 | 6/1987 | Murata et al. | 358/133 X |
| 4,694,414 | 9/1987 | Christopher | 364/724 |

OTHER PUBLICATIONS

R. W. Schafer & L. R. Rabiner, "A Digital Signal Processing Approach to Interpolation" Proc of IEEE, vol. 61, No. 6 Jun. 1973, pp. 692-702.

Primary Examiner—Howard W. Britton
Assistant Examiner—Victor R. Kostak
Attorney, Agent, or Firm—Eugene M. Whitacre; Paul J. Rasmussen; Eric P. Herrmann

[57] ABSTRACT

A simplified-in-structure vertical interpolator for compressed video data down-loaded from image memory to an odd-line line storage memory and an even-line line storage memory is followed in cascade by a horizontal interpolator. The horizontal interpolator calculates the difference between adjoining pixels in horizontally compressed video data from the vertical interpolator, divides the difference by the horizontal compression ratio and accumulates the divided differences during line trace intervals to recover de-compressed video data.

16 Claims, 5 Drawing Sheets

| OUTPUT SCAN LINE | 101 CONTENTS | 102 CONTENTS | MUX 103 SELECTION | MUX 107 SELECTION | MUX 111 SELECTION |
|---|---|---|---|---|---|
| 1  | $L_1$        | DON'T CARE    | $L_1$     | $L_1$     | DON'T CARE |
| 2  | $L_1$        | $L_2$         | OPP. 107  | OPP. 103  | 1/2 |
| 3  | $L_1$ OR $L_3$ | $L_2$       | $L_2$     | $L_2$     | DON'T CARE |
| 4  | $L_3$        | $L_2$         | OPP. 107  | OPP. 103  | 1/2 |
| 5  | $L_3$        | $L_2$ OR $L_4$ | $L_3$    | $L_3$     | DON'T CARE |
| 6  | $L_3$        | $L_4$         | OPP. 107  | OPP. 103  | 1/2 |
| 7  | $L_3$ OR $L_5$ | $L_4$       | $L_4$     | $L_4$     | DON'T CARE |
| 8  | $L_5$        | $L_4$         | OPP. 107  | OPP. 103  | 1/2 |
| 9  | $L_5$        | $L_4$ OR $L_6$ | $L_5$    | $L_5$     | DON'T CARE |
| 10 | $L_5$        | $L_6$         | OPP. 107  | OPP. 103  | 1/2 |
| 11 | $L_5$ OR $L_7$ | $L_6$       | $L_6$     | $L_6$     | DON'T CARE |
| 12 | $L_7$        | $L_6$         | OPP. 107  | OPP. 103  | 1/2 |
| 13 | $L_7$        | $L_6$ OR $L_8$ | $L_7$    | $L_7$     | DON'T CARE |

OPERATION WITH 2:1 VERTICALLY SUBSAMPLED INPUT
SCAN LINES $L_1, L_2, L_3, L_4, L_5, L_6, L_7$ ETC.

*Fig. 2*

| OUTPUT SCAN LINE | 101 CONTENTS | 102 CONTENTS | MUX 103 SELECTION | MUX 107 SELECTION | MUX 111 SELECTION |
|---|---|---|---|---|---|
| 1 | $L_1$ | DON'T CARE | $L_1$ | $L_1$ | DON'T CARE |
| 2 | $L_1$ | $L_2$ | $L_1$ | $L_2$ | 1/4 |
| 3 | $L_1$ | $L_2$ | OPP. 107 | OPP. 103 | 1/2 |
| 4 | $L_1$ | $L_2$ | $L_2$ | $L_1$ | 1/4 |
| 5 | $L_1$ OR $L_3$ | $L_2$ | $L_2$ | $L_2$ | DON'T CARE |
| 6 | $L_3$ | $L_2$ | $L_2$ | $L_3$ | 1/4 |
| 7 | $L_3$ | $L_2$ | OPP. 107 | OPP. 103 | 1/2 |
| 8 | $L_3$ | $L_2$ | $L_3$ | $L_2$ | 1/4 |
| 9 | $L_3$ | $L_2$ OR $L_4$ | $L_3$ | $L_3$ | DON'T CARE |
| 10 | $L_3$ | $L_4$ | $L_3$ | $L_4$ | 1/4 |
| 11 | $L_3$ | $L_4$ | OPP. 107 | OPP. 103 | 1/2 |
| 12 | $L_3$ | $L_4$ | $L_4$ | $L_3$ | 1/4 |
| 13 | $L_3$ OR $L_5$ | $L_4$ | $L_4$ | $L_4$ | DON'T CARE |
| 14 | $L_5$ | $L_4$ | $L_4$ | $L_5$ | 1/4 |
| 15 | $L_5$ | $L_4$ | OPP. 107 | OPP. 103 | 1/2 |
| 16 | $L_5$ | $L_4$ OR $L_6$ | $L_5$ | $L_4$ | 1/4 |
| 17 | $L_5$ | $L_6$ | $L_5$ | $L_5$ | DON'T CARE |
| 18 | $L_5$ | $L_6$ | $L_5$ | $L_6$ | 1/4 |
| 19 | $L_5$ | $L_6$ | OPP. 107 | OPP. 103 | 1/2 |
| 20 | $L_5$ | $L_6$ | $L_6$ | $L_5$ | 1/4 |
| 21 | $L_5$ OR $L_7$ | $L_6$ | $L_6$ | $L_6$ | DON'T CARE |
| 22 | $L_7$ | $L_6$ | $L_6$ | $L_7$ | 1/4 |
| 23 | $L_7$ | $L_6$ | OPP. 107 | OPP. 103 | 1/2 |
| 24 | $L_7$ | $L_6$ | $L_7$ | $L_6$ | 1/4 |
| 25 | $L_7$ | $L_6$ OR $L_8$ | $L_7$ | $L_7$ | DON'T CARE |

OPERATION WITH 4:1 VERTICALLY SUBSAMPLED INPUT
SCAN LINES $L_1, L_2, L_3, L_4, L_5, L_6, L_7$ ETC.

*Fig. 3*

INTERPOLATOR FOR COMPRESSED VIDEO DATA

This is a continuation-in-part of application Ser. No. 038,096, filed Apr. 13, 1987, now abandoned.

The present invention relates to interpolators for compressed video data.

BACKGROUND OF THE INVENTION

D. L. Sprague, N. J. Fedele and L. D. Ryan in a U.S. Pat. No. 4,740,832 issued 26 April 1987, entitled NON-DEDICATED IMAGE MEMORY USING SEPARATE BIT-MAP ORGANIZATIONS FOR LUMINANCE AND CHROMINANCE VARIABLES and assigned to RCA Corporation describe a system for retrieving stored images from video random-access memory (VRAM). A VRAM is a dual-ported memory including a dynamic random-access memory with a random-access read/write port and including a relatively small, auxiliary, static serial memory with a serial output port. The auxiliary memory can upon command have its storage locations loaded in parallel from any row of storage locations in the larger dynamic memory. Thereafter the auxiliary memory has its storage locations scanned by a counter operating as an address generator and is read out in a shift register operation to supply a stream of video data.

In the Sprague-Fedele-Ryan system images are described in terms of luminance and chrominance components, each of which has its own bit-map organization associated therewith in the dynamic memory portion of VRAM. Groups of bits descriptive of the luminance or chrominance of a pixel are stored together in a conformal mapping of the display in a "bit-map-organized" memory as that term is employed in this specification. The luminance components are generally more densely sampled in image field space than the chrominance components are; this is done to conserve image memory, recognizing that visual acuity for chrominance is less than that for luminance. VRAM is "linearly packed"—i.e., the raster scanning of pixel codes is stored in successive rows of the dynamic memory. Rows in dynamic memory do not necessarily have a 1:1 correspondence with scan lines in the ultimate display. A formatter known as a "pixel unwrapper" takes a stream of data supplied to it from the VRAM serial output port and passes it into scan lines of successive pixel codes.

During line trace intervals in the display, VRAM from its output port supplies data from which data the pixel-unwrapper generates a stream of pixel codes describing luminance in real time. During selected line retrace intervals in the display, VRAM supplies data from its serial output port from which data the pixel unwrapper generates two streams of pixel codes describing chrominance in a compressed-in-time and advanced-in-time format. Each stream of chrominance components is supplied to a respective chrominance re-sampling apparatus, each of which re-sampling apparatuses comprises a respective odd-line line-storage memory, a respective even-line line-storage memory and an interpolator. Successive lines of each stream of compressed chrominance data are selcted on an alternating basis for writing into its odd-line or its even-line line-storage memory. These line storage memories act as a rate-buffer to supply samples to their interpolator, which generates samples of the chrominance component with compression removed and with delay to temporally align them with the real-time luminance samples. The luminance samples and the two sets of chrominance samples are converted from digital to analog form and are linearly combined, for generating red, green and blue analog video signals. These analog video signals are amplified and gamma-corrected to provide drive signals for the display apparatus, typically a color kinescope.

The Sprague, Fedele and Ryan interpolator uses a cascade of n basic interpolator blocks and a multiplexer to re-sample each set of supplied chrominance samples $2^n$ times more densely in both the direction of pixel scan and the direction of line advance. Each basic interpolator block includes three multiplexers, three adders, two clocked unit-delay latches and bit-place shift circuitry.

SUMMARY OF THE INVENTION

The invention is directed to interpolator circuitry that can be more readily programmed to do either 2:1 or 4:1 spatial interpolation and that reduces the amount of hardware associated with spatial interpolation.

BRIEF DESCRIPTION OF THE DRAWINGS

FIG. 2 is a table of the operating conditions for the FIG. 1 vertical interpolator when video input signal is vertically subsampled 2:1.

FIG. 3 is a table of the operating conditions for the FIG. 1 vertical interpolator when video input signal is vertically subsampled 4:1.

DETAILED DESCRIPTION

Figure 1:
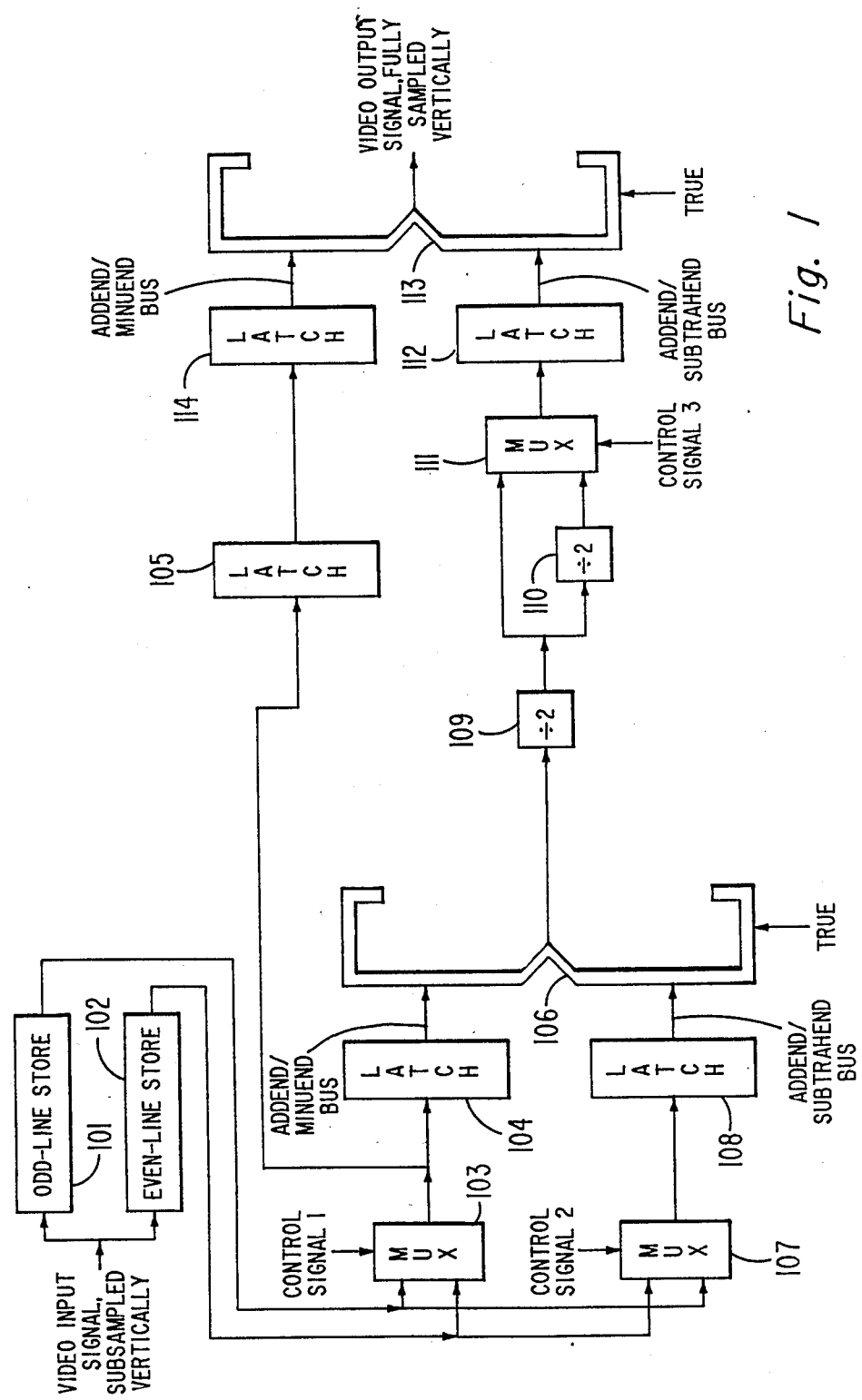
FIG. 1 is a schematic diagram of a vertical interpolator for subsampled image data, which interpolator embodies an aspect of the invention.

In the FIG. 1 vertical interpolator the video input signal is subsampled n:1 vertically and can be subsampled p:1 horizontally, where n can be two or four, and where p is a positive integer. The successive lines of subsampled video in each frame are consecutively ordinally numbered beginning with first in order of their appearance, it being presumed field interlace is not used. An odd-line line-storage memory 101 is loaded with the first line of subsampled video input signal in a time interval preceding the first scan line of video output signal, which is not subsampled vertically. An even-line line-storage memory 102 is loaded with the second line of subsampled video input signal in a time interval preceding the second scan line of video output signal. During each line trace interval of the video output signal, line stores 101 and 102 are non-destructively read from serially at the subsampling rate of the video output signal of the FIG. 1 interpolator. The odd-line store 101 is cyclically reloaded a line at a time during each of a plurality of time windows with a successive one of the odd-numbered lines of vertically subsampled video input signal. Reloadings occur every $2n^{th}$ line in the video output signal of the FIG. 1 apparatus, respectively, starting with a time window between the $(n-1)^{th}$ and $(n+1)^{th}$ line trace intervals of the video output signal of the FIG. 1 interpolator. The even-line store 102 is cyclically reloaded a line at a time during each of a plurality of time windows with a respective successive one of the even-numbered lines of vertically subsampled video input signal. Reloadings occur every $2n^{th}$ line of the video output signal of the FIG. 1 interpolator, respectively, starting with a time window between the $(2n-1)^{th}$ and $(2n+1)^{th}$ line trace intervals of the video output signal of the FIG. 1 interpolator. These time windows are placed in a line retrace interval, when the vertical interpolator is used in the Sprague-Fedele-Ryan system.

Loading of line stores 101 and 102 is done serially, presuming them to be loaded from the serial port of a VRAM. However, in other embodiments of the invention line stores 101 and 102 are loaded parallelly, rather than serially in time. Parallel-series loading arrangements can also be implemented.

A multiplexer 103 is operative to select the serial read-out from one or the other of the line stores 101 and 102 for data latches 104 and 105. Latch 104 supplies the addend/minuend bus of an adder/subtractor 106, and latch 105 aids in compensating for phase delay between adder/subtractor 106 addend/minuend bus and its output terminal attendant upon the use of phased logic. A multiplexer 107 is operative to select the serial read-out from one or the other of the line stores 101 and 102 for a data latch 108, which supplies the addend/subtrahend bus of adder/subtractor 106. Adder/subtractor 106 is conditioned by a TRUE control signal to operate as a subtractor supplying a difference signal output to a divide-by-two circuit 109. The divided-by-two difference signal from divide-by-two circuit 109 is applied to another divide-by-two circuit 110 to generate a divided-by-four difference signal. Divide-by-two circuits 109 and 110 each typically consist of a simple shift of all bit places to the next least significant bit places.

If the video input signal to line stores 101 and 102 is subsampled 2:1 vertically, a multiplexer 111 receives a first state of control signal (e.g., TRUE) conditioning it to apply to a data latch 112 the dividedby-two difference signal from divide-by-two circuit 109. If the video input signal to line stores 101 and 102 is subsampled 4:1 vertically, multiplexer 111 control signal alternates between the first state where the divided-by-two difference signal is applied to latch 112 and a second state (FALSE if the first state be true) where the divided-by-four difference signal is applied to latch 112.

Latch 112 supplies the addend/subtrahend bus of an adder/subtractor 113, which is conditioned by a TRUE control signal to operate as a subtractor. The addend/minuend bus of adder/subtractor 113 is supplied from a data latch 114 that receives delay-adjusted multiplexer 103 output signal from latch 105. The difference output signal from adder/subtractor 113 is to be a video output signal that is a replica of the original image data as subsampled horizontally and fully sampled vertically. This replica may contain error caused by the vertical subsampling of the video input signal from which it was generated through interpolation.

FIG. 2 tabulates the operation of the FIG. 1 vertical interpolator when the video input signal is subsampled 2:1 in the vertical direction. The video output signal scan lines are consecutively numbered in the order of their being scanned in the raster scan. The scan lines in the subsampled set are denominated $L_1$, $L_2$, $L_3$, $L_4$, $L_5$, $L_6$, $L_7$ et seq. with the consecutively numbered subscripts denoting the order of their being scanned in the raster scan. The line-store 101 and 102 contents are as described above.

When the video output signal scan line corresponds to a scan line in the 2:1 subsampled set, both multiplexers 103 and 107 select that subsample scan line—from line-store 101, if the scan line be odd in the 2:1 subsample set, or from line-store 102, if the scan line be even in the 2:1 subsample set. Whether multiplexer 111 selects to latch 112 one-half or one-fourth of the subtractor 106 difference output signal is of no consequence, since the minuend and subtrahend supplied subtractor 106 are equal to each other to cause its difference output signal to be zero-valued.

When the video output signal scan line is half-way between two scan lines in the 2:1 subsampled set, multiplexers 103 and 107 select outputs from different ones of the line stores 101 and 102 for application to latches 104 and 108, respectively. The indications in the FIG. 2 table that multiplexer 103 selection is opposite 107's and multiplexer 107 selection is opposite 103's refer to the fact that multiplexers 103 and 107 select from opposite ones of line stores 101 and 102. Multiplexer 111 is conditioned by its control signal to select to latch 112 one-half of the subtractor 106 difference output signal.

For example, in the second scan line of the output video signal, if multiplexers 103 and 107 select 2:1 subsample set scan lines $L_2$ and $L_3$ as minuend and subtrahend for subtractor 106, its difference output signal $L_1-L_2$ is halved to generate $(L_1-L_2)/2$ subtrahend signal for subtractor 113. Subtracting this from its $L_2$ minuend signal, subtractor 113 supplies as difference output signal $L_1-[(L_1-L_2)/2[=(L_1/2)+(L_22)$. That is, 2:1 subsample set scan lines $L_2$ and $L_3$ are averaged to generate the second scan line of output video signal.

FIG. 3 tabulates the operation of the FIG. 1 vertical interpolator when the video input signal is subsampled 4:1 in the vertical direction. The line store 101 and 102 contents are as described in the general description of FIG. 1.

Operation when the video output signal scan line corresponds to a scan line in the 4:1 subsample set is the same as when it corresponds to a scan line in the 2:1 subsample set. Operation when the output video signal scan line is half-way between two scan lines in the 4:1 subsample set is the same as operation when it is half-way between two scan lines in the 2:1 subsample set.

What are more of interest are the other two spatial phases of vertical interpolation from the 4:1 subsample set. Multiplexers 103 and 107 respectively select the subsample scan lines closer to and further from the video output signal scan line for respective application to latches 104 and 108. Multiplexer 111 is conditioned by its control signal to select to latch 112 one-fourth the difference output signal of subtractor 106.

In the second scan line of output video signal, for example, $L_1$ is to be weighted by $\frac{3}{4}$ and $L_2$ is to be weighted $\frac{1}{4}$. Multiplexer 103 selects $L_1$ as being the 2:1 subsample set scan line closer to the output video signal scan line, and multiplexer 107 selects $L_2$ as being the 2:1 subsample set scan line further from the output video signal scan line. Multiplexer 111 is conditioned by its control signal to cause subtractor 106 difference output signal $(L_1-L_2)$ to be quartered in divide-by-two circuits 109 and 110. Subtractor 113 subtracts $(L_1-L_2)/4$ from $L_1$ to generate a difference output signal $L_1-[(L_1-L_2)/4]=(3L_1/4)+(L_2/4)$.

In the fourth scan line of output video signal, on the other hand, $L_2$ is to be weighted by $\frac{3}{4}$ and $L_1$ is to be weighted by $\frac{1}{4}$. Multiplexer 103 selects $L_2$ as the closer 2:1 subsample set scan line, and multiplexer 107 selects $L_1$ as the further 2:1 subsample set scan line. Subtractor 106 $(L_2-L_1)$ difference output signal is quartered in cascaded divide-by-two circuits 109 and 110, under multiplexer 111 control. Subtractor 113 subtracts $(L_2-L_1)/4$ $L_2$ to generate a difference output signal $L_2-[(L_2-L_1)/4]=(L_1/4)+(3L_2/4)$.

Figure 4:
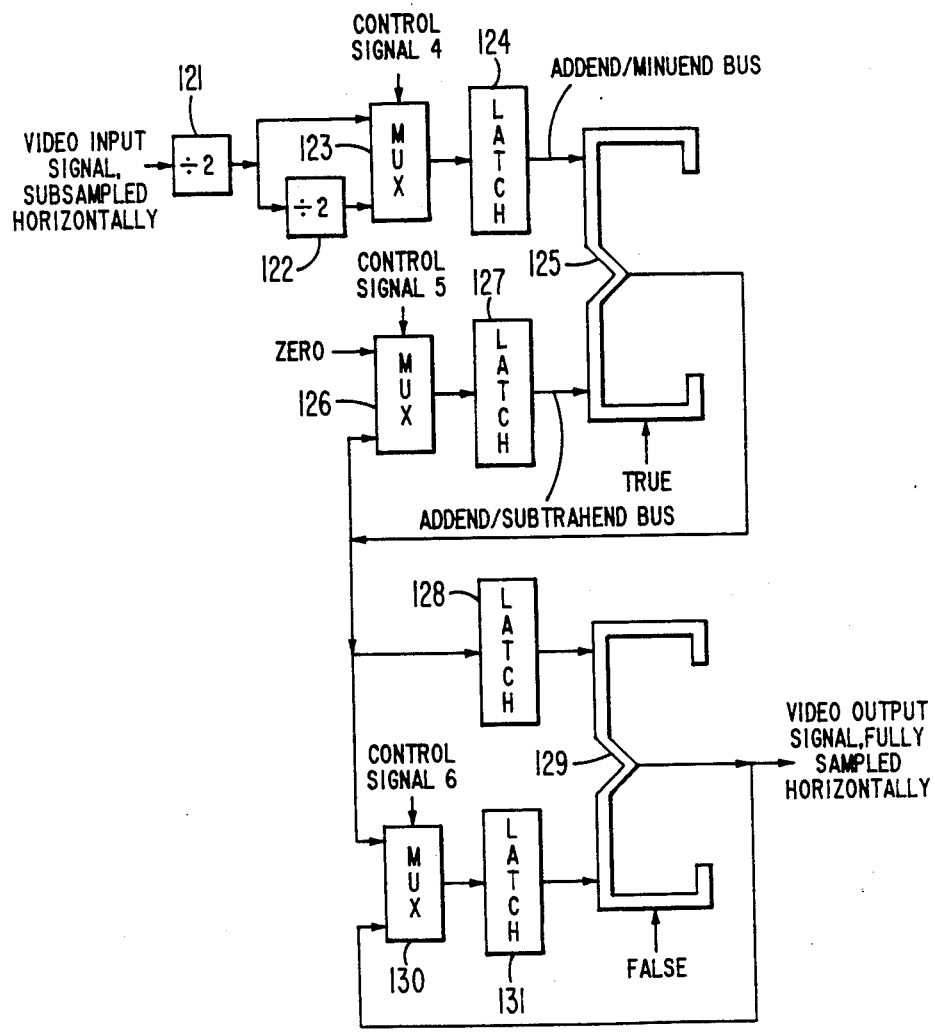
FIG. 4 is a schematic diagram of a horizontal interpolator for subsampled image data, which interpolator embodies an aspect of the invention.

In the FIG. 4 horizontal interpolator the video input signal, which may be the difference output signal from the adder/subtractor 113 of the FIG. 1 vertical interpolator, is subsampled p:1 horizontally, where p can be two or four. This video input signal is supplied to a divide-by-two circuit 121, which is usually just a bit-place shifter. The half video input signal from divide-by-two circuit 121 is supplied to another divide-by-two circuit 122 to generate one-fourth video input signal. A multiplexer 123 selects either one-half or one-fourth video input signal to a data latch 124 at the addend-/minuend input bus of an adder/subtractor 125 conditioned by a TRUE signal to operate as a subtractor.

At the beginning of a horizontal scan line of video input signal samples, for a valve of pequal to two, multiplexer 123 selects one-half video input signal to latch 124. A multiplexer 126 selects a ZERO input signal to a data latch 127 connected to the addend/subtrahend input of adder/subtractor 125, so the difference output signal is one-half the initial sample $S_1$ of video input signal. This half value $S_1/2$ is applied to a data latch 128 supplying one of the two addend signals for an adder/subtractor 129 conditioned by a FALSE signal to operate as an adder. A multiplexer 130 selects this half value $S_1/2$ to a data latch 131 supplying the other of the two addend signals for adder 129. The sum output of adder 129 is the sum of the half values—that is, the full value $S_1$ of the first video input signal sample in the scan line.

For the remainder of the scan line, whether p be two or four, multiplexer 130 selects the sum output of adder 129 to the latch 131. This provides for an accumulation operation clocked at output sample rate. The difference output signal from subtractor 125 will indicate the amount of change from one pixel to the next, which is to increment the adder 129 sum output. Consider now how this increment is calculated, first for p equal to two, then for p equal to four.

If p equal two, multiplexer 123 selects one-half video input signal to latch 124 throughout the scan line. Multiplexer 126 selects the half-value initial sample $S_1/2$ to latch 127 to be subtracted in subtractor 125 from the half-value second sample $S_2/2$ clocked into latch 124. Subtractor 125 supplies a difference output signal $(S_2/2)-(S_1/2)$ to be accumulated over two output clock cycles. The $S_1$ output sample from adder 129 is incremented by $(S_2/2)-(S_1/2)$ on the first output clock cycle to generate the output sample $S_1+[(S_/22)-(S_1/2)]=(S_1/2)+(S_2/2)$. This output sample is incremented by $(S_2/2)-(S_1/2)$ on the second clock cycle to generate the output sample $(S_1/2)+(S_2/2)+[(S_2/2)-(S_1/2)]=S_2$. Multiplexer 126 then selects ZERO to latch 127, changing subtractor 125 difference output signal to $S_2/2$. The cycle to generate the increment $(S_3/2)-S_2/2)$ then commences as multiplexer 126 selects $S_2/2$ to latch 127. $[(S_3/2)-(S_2/2)]$ will be accumulated the next two output clock cycles. This general procedure of generating the $[S_{(k+1)}/2)-(S_k/2)]$ increment at subtractor 125 output and accumulating with it for two output clock cycles is continued throughout the scan line with k taking successive integral values.

If p equal four, multiplexer 123 selects one-fourth video input signal to latch 124 throughout the scan line. $[(S_{(k+1)}/4)-(S_k/4)]$ increment is calculated similarly to the way $[(S_{(k+1)}/2)-(S_k/2)]$ was in the preceding paragraph. This increment is accumulated for four successive output cycles, rather than two, before the next increment is calculated.

There are a variety of modes to initialize the horizontal interplator, for p equal to four, using combinations of one-half and one-fourth of the first sample, with trade offs between the latency before the first valid sample occurs and clocking complexity. One mode of operation of the FIG. 4 circuitry, for p equal to four, will be described with reference to FIG. 5. This mode uses unaltered clocking signals for the entire horizontal line, including initialization.

Figure 5:
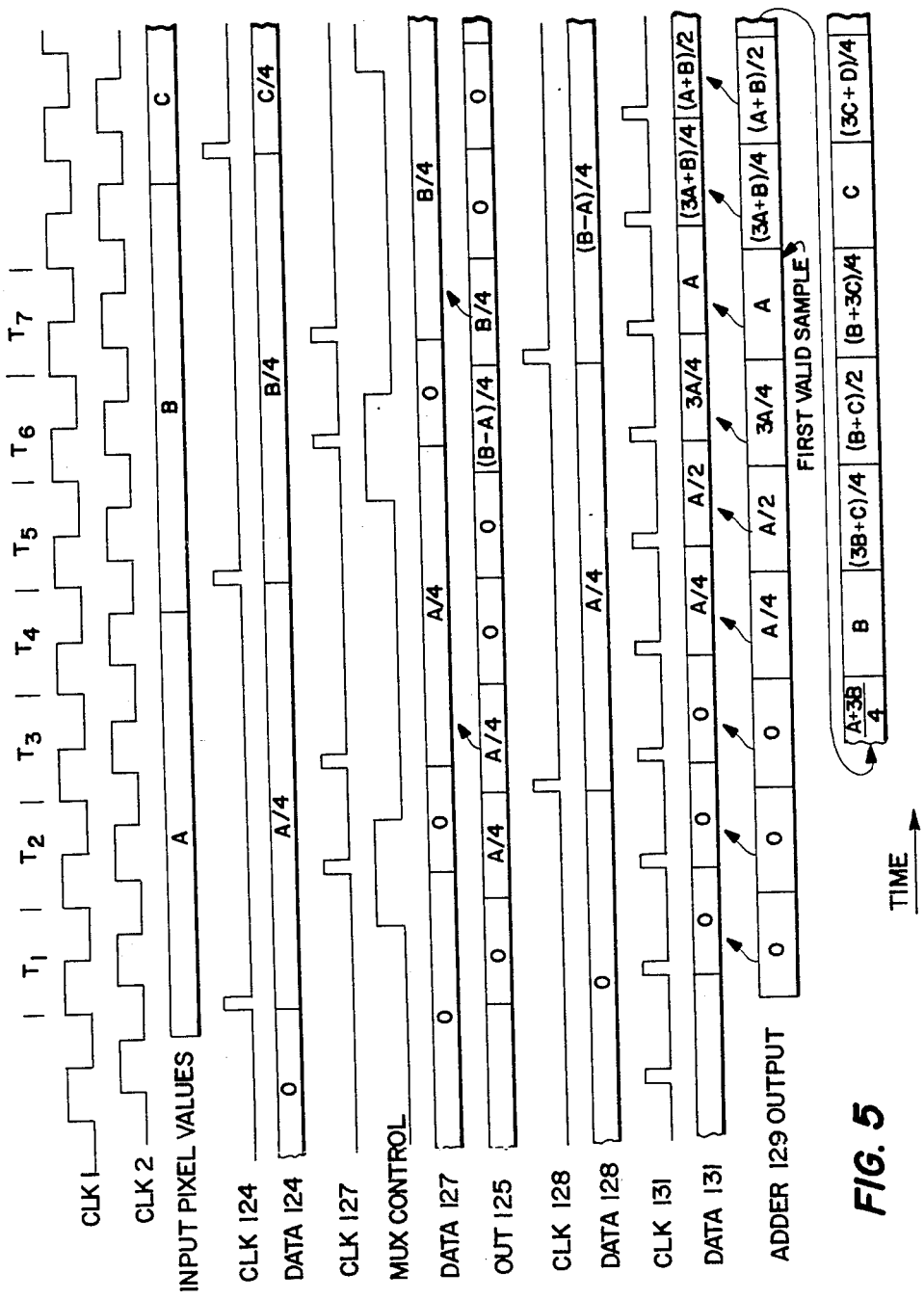
FIG. 5 is a timing diagram useful in describing the horizontal interpolator of FIG. 4.

Referring first to FIG. 5, signals CLK 1 and CLK 2 have frequencies equal to the output pixel rate, i.e., four times the input pixel rate. Signal CLK 2 is delayed relative to signal CLK 1 and in the illustrated example the delay of 90 degrees. It is presumed that subtracter 125 and adder 129 operate synchronously with the signal CLK 1. In addition, latches 127 and 131 are respectietly required to capture output values from subtractor 125 and adder 129 within the pixel interval that they are produced. This is accommodated by clocking latche 127 and 131 with clock signals which are delayed with respect to the synchronous operation of the adder and subtracter. The amount of phase delay is a function of the speed of the devices and the desired pixel rate. One skilled in the art of circuit design will establish this delay in accordance with the parameters of the devices of his choice and the pixel rate his system is designed to produce.

Latches 124, 127, 128 and 131 are assumed to be "data" or "D-type" latches. Such latches have a clock input and responsive to a transition at this input (assumed positive), loads the data which is at its data input terminal immediately prior to the transition. Signals CLK 124, CLK 127, CLK 128 and CLK 131 are clock signals applied to the clock input terminals of latches 124, 127, 128 and 131, respectively. The clock signals are shown having narrow pulses, but they may in face be respective pulses of signals CLK 1 and CLK 2 which are gated to the respective circuit element at the appropriate time.

Also shown in FIG. 5 is the data value in each latch during each clock period as well as the output values provided by subtracter 127 (i.e. DATA 127) and adder 129.

Input pixel values A, B, C are the first three pixel values of a compressed line of video signal and pixel value A will nominally be the first pixel value of the decompressed line of video signal. Immediately prior to the application of input pixel value A (at the beginning of each horizontal line interval) the FIG. 4 system is reset so that the latches all contain zero values. In addition, multiplexer 123 is conditioned to couple divider 122 to latch 124 and multiplexer 130 is conditioned to couple the output of adder 129 to latch 131. Multiplexers 123 and 130 are maintained in this state throughout each line interval in this mode of operation.

At the first positive transition of signal CLK 1 ($T_1$) after input value A is applied, signal CLK 124 loads the value A/4 into latch 124. Latch 127 contains a zero (reset) value and thus subtracter 124 provides the value A/4 at its output one clock period later ($T_2$). CLK 124 loads a new value into latch 124 every $p^{th}$ cycle of signal CLK 1 ($T_1$, $T_5$, $T_9$). One cycle after CLK 124 loads latch 124 ($T_2$) signal CLK 127, synchronous with signal CLK 2, and every $p^{th}$ cycle of signal CLK 2 thereafter, loads a zero value from multiplexer 126 into latch 127. After the first pulse of signal CLK 127, latches 124 and 127 contain value A/4 and zero, thus on the next cycle of signal CLK 1 ($T_3$) subtracter 125 again provides the value A/4. Multiplexer 126 then changes state and on the next cycle of signal CLK 2 ($T_3$), and every $p^{th}$ cycle thereafter ($T_7$, $T_{11}$, etc.), signal CLK 127 loads the output from subtracter 125 into latch 127, which value is held for three periods of signal CLK 2. After the first such pulse of signal CLK 127 (the second pulse of CLK 127 illustrated in FIG. 5) latch 127 contains the value A/4. Since latches 124 and 127 each contain the value A/4 for this and the next subsequent period of signal CLK 1 ($T_3$, $T_4$) subtracter 125 will provide an outut value of zero for the two subsequent clock periods ($T_4$, $T_5$).

The first pulse of signal CLK 128 occurs during period $T_3$ and subsequent pulses every $p^{th}$ period thereafter at which times latch 128 is loaded with the output from subtracter 125. The values loaded into latch 128 are equal to 1/P times the quantity of the most current input pixel value minus the previous input pixel value. Signal CLK 131, having a pulse every period of signal CLK 2 loads latch 131 with the previous output value provided by adder 129. At period $T_3$ this value is equal to zero, hence at period $T_4$ the output of adder 129 is A/4. This value is loaded into latch 131 during period $T_4$ and is added to the value A/4 provided by latch 128 to provide the value A/2 at period $T_5$ and so forth. Subsequent output values provided by adder 129 at intervals $T_i$, may be determined by summing the values in latches 128 and 131 illustrated in FIG. 5, that occur in intervals $T_{i-1}$. The first valid interpolated output value occurs during period $T_7$ and all subsequent output values are valid pixel values.

THE FIG. 4 horizontal interpolator may be modified by replacing divide-by-two circuit 121 with a divide-by-four circuit. This will permit selection between horizontal interpolation to resample 4:1 horizontal subsampling to full horizontal sampling and horizontal interpolation to resample 8:1 horizontal subsampling to full horizontal sampling. One skilled in the art and equipped with the foregoing disclosure can readily design a horizontal interpolator offering interpolation up from 2:1, 4:1 or 8:1 horizontal subsampling. Where 8:1 vertical subsampling is to be used, it is preferable to do this using line interlace on alternate fields and using the FIG. 1 interpolator in its 4:1 mode.

However, where progressive scanning is desired together with 8:1 vertical subsampling is desired, this can be provided for as follows. The input bus to the line stores 101 and 102 is taken from a multiplexer that can select between VRAM output and FIG. 1 interpolator output. In the line retrace interval just before the line trace interval of a display scan line that is generated without need for vertical interpolation from a vertically subsampled scan line, the line store holding the previous vertically subsampled line is loaded with the succeeding vertically subsampled line. In the next line retrace interval the contents of the two line stores are weighted by one-half and added by the FIG. 1 interpolator. This sum is used to replace the contents of the line store loaded during the previous line retrace interval in a read-then-write operation. Other than loading the line stores 101 and 102 differently, with interpolated lines in the line retrace intervals flanking every fourth display scan line line trace interval, the FIG. 1 interpolator is operated in its 4:1 mode.

What is claimed is:

1. An interpolator for compressed video data representing every pixel in every $n^{th}$ line of a raster of consecutively numbered successive line trace intervals therein throughout display field scan, p being a positive integer and n being an integer at least two, said interpolator comprising:

first and second line-storage memories, capable of being serially read without loss of data;

means for writing the odd-numbered lines of compressed video data into first line-storage memory, each odd-numbered line of compressed video data being written into said first line-storage memory within a respective one of a first set of windows in time, the first line of compressed video data being written into said first line-storage memory during the first window of said first set of windows in time which window is previous to the first line trace interval in the display field, the third line of compressed video being written into said first line-storage memory within the second window of said first set of windows in time which window includes the $(n+1)^{th}$ line trace interval and the line retrace intervals which flank it in time, and the remaining odd-numbered lines of compressed video data being written into said first line-storage memory within respective remaining ones of said first set of windows in time occurring at times that are multiples of 2n line later in time than the second window in said first set of windows;

means for writing the even-numbered lines of compressed video data into said second line-storage memory, each even-numbered line of compressed video data being written into said second line-storage memory within a respective one of a second set of windows in time, the second line of compressed video data being written into said second line-storage memory during the first window of said second set of windows in time, which window is previous to the second line trace interval in the display field, the fourth line of compressed video data being written into said second line-storage memory within the second window of a second set of windows in time which window includes the $(2n+1)^{th}$ line trace interval and the line retrace intervals which flank it in time, and the remaining even-numbered lines of compressed video data being written into said second line-storage memory within respective remaining ones of said second set of windows in time occurring at times that are multiples of 2n lines later in time than the second window in said second set of windows;

means for serially reading respective streams of compressed video data from said first and second line storage means at 1/p pixel scan rate during each line trace interval;

a first multiplexer having a first input connection for receiving compressed video data read from said first line-storage memory, having a second input connection for receiving compressed video data read from said second line storage memory, and having an output connection for supplying the data received at one of its input connections as determined by a first multiplexer control signal;

a second multiplexer having a first input connection for receiving compressed video data from said first line-storage memory, having a second input connection for receiving compressed video data from said second line-storage memory, and having an output connection for supplying the data received at one of its input connections as determined by a second multiplexer control signal;

a first subtractor having a minuend input connection to which compressed video data selected to the output connection of said first multiplexer is applied, having a subtrahend connection to which compressed video data selected to the output connection of said second multiplexer is applied, and having a difference output connection;

a second subtractor having a minuend input connection to which compressed video data selected to the output connection of said first multiplexer is applied, having a subtrahend input connection, and having difference output connection from which video data no longer compressed in the direction perpendicular to line trace is supplied;

first weighting means for weighting, in a prescribed pattern, the difference output from said first subtractor to supply data to the subtrahend input connection of said second subtractor; and control apparatus responsive to the selection of n for generating said first multiplexer control signal, said second multiplexer control signal and said first weighting means control signal.

2. An interpolator as set forth in claim 1 wherein said control apparatus includes:

means for generating, during the first line trace interval and every $2n^{th}$ line trace interval thereafter throughout display field scan, a value of said first multiplexer control signal causing said first multiplexer to select its first input connection to be connected to its output connection, and a value of said second multiplexer control signal causing said second multiplexer to select its first input connection to be connected to its output connection;

means for generating, during the $(n+1)^{th}$ line trace interval and every $2n^{th}$ line trace interval thereafter throughout display field scan, a value of said first multiplexer control signal causing said first multiplexer to selects its second input connection to be connected to its input connection, and a value of said second multiplexer control signal causing said second multiplexer to select its second input connection to be connected to its output connection; and means for generating, during the $[(n/2)+1]^{th}$ line trace interval and every $n^{th}$ line trace interval thereafter throughout display field scan, values of said first and second multiplexer control signals for causing one of said first and second multiplexers to select its first input connection to be connected to its output connection and for causing the other of said first and second multiplexers to select its second input connection to be connected to its output connection.

3. An interpolator as set forth in claim 2, wherein n has a value of two, and wherein said first weighting means does weighting of the data from the difference output of said first subtractor by a factor of one-half during the $[(n/2)+1]^{th}$ line trace interval and every $n^{th}$ line trace interval thereafter throughout display field scan.

4. An interpolator as set forth in claim 3 wherein said first weighting means includes a bit-place shifter for shifting the data from the difference output of said first subtractor to one-bit-place less significance, for doing said weighting of the data from the difference output of said first subtractor by a factor of one-half.

5. An interpolator as set forth in claim 2 wherein said control apparatus includes further means, operative only when n is selected to be at least four, for generating first and second multiplexer control signals during a first range of line trace intervals with numbering between the first and $[(n/2)+1]^{th}$ line trace intervals, during a second range of line trace intervals with numbering between the $[(n/2)+1]^{th}$ and $(n+1)^{th}$ line trace intervals, during a third range of line trace intervals with numbering between the $(n+1)^{th}$ and $[(3n/2)-1]^{th}$ line trace intervals, during a fourth range of line trace intervals with numbering between the $[(3n/2)+1]^{th}$ and $[2n+1]^{th}$ line trace intervals, and further ranges disposed every 2n lines later than said first through fourth ranges throughout display field scan, which means more particularly comprise:

means for generating, during line trace intervals in said first and fourth ranges and in ones of said further ranges every 2n lines later than them throughout display field scan, the value of said first multiplexer control signal causing said first multiplexer to select its first input connection for connection to its output connection, and the value of said second multiplexer control signal causing said second multiplexer to select its second input connection for connection to its output connection; and means for generating, during line trace intervals in said second and third ranges and in ones of said further ranges every 2n lines larger than them throughout display field scan, the value of said first multiplexer control signal causing said first multiplexer to select its second input connection for connection to its output connection, and the value of said second multiplexer control signal causing said second multiplexer to select its first input connection for connection to its output connection.

6. An interpolator as set forth in claim 5, wherein n has a selected one of the values two and four, and wherein said first weighting means does weighting of the data from the difference output of said first subtractor, by a factor of one-half during the $[(n/2)+1]^{th}$ line trace interval and every $n^{th}$ line trace interval thereafter throughout display field scan, and by a factor of one quarter during said first and second and third and fourth ranges.

7. An interpolator as set forth in claim 6 wherein said first weighting means is a cascade connection of first and second single-bit-place shifters between the difference output of said first subtractor and the subtrahend input of said second subtractor, and wherein said control apparatus generates a first weighting means control signal applied to said first and second single-bit-place shifters, for causing both said first and second single-bit-place shifters to shift data supplied to them to one-bit-place less significance during line trace intervals with numbering within said first and second and third and fourth and further ranges, and for causing only one of said first and second single-bit-place shifters to shift data supplied to it to one-bit-place less significance during the $[(n/2)+1]^{th}$ line trace interval and every $n^{th}$ line trace interval thereafter throughout display field scan.

8. An interpolator as set forth in claim 1, wherein p is greater than unity, having in cascade thereafter a further interpolator operative to decompress video data in the direction of line trace.

9. An interpolator as set forth in claim 1 wherein p is greater than unity, having in cascade thereafter a further interpolator comprising:
- a third subtractor having a minuend input connection, having a subtrahend input connection and having a difference output connection;
- second weighting means for weighting the difference output from said second subtractor to supply data to the minuend input connection of said third subtractor, said weighting being by a factor of 1/p at least during a portion of each line interval;
- a first latch for latching the second subtractor output as weighted by said second weighting means and applying latched data to the minuend input connections of said third subtractor;
- a third multiplexer having a first input connection for receiving a zero-valued datum, having a second input connetion for receiving data from the difference output connection of said third subtractor, and having an output connection supplying said zero-valued datum every $p^{th}$ pixel interval in such line trace interval and supplying data received from the difference output connection of said third subtractor for the remainder of each line trace interval;
- a second latch for latching the data appearing at the output connection of said third multiplexer at selected times and applying them to the subtrahend input connection of said third subtractor;
- a third latch for latching within each pixel of each line trace interval then appearing data at the output of said third subtractor;
- an adder having a first addendum input connection for receiving data from said third latch, having a second addendum input connection, and having a sum output connection from which is supplied video data that is de-compressed both in the direction of line trace and the direction perpendicular thereto;
- a fourth multiplexer having a first input connection for receiving data from the difference output of said third subtractor, having a second input connection for receiving data from the sum output of said adder, and having an output connection supplying the data from the difference output of said third subtractor during the first pixel of each line trace interval and supplying data from the sum output of said adder during the remaining pixels of each line trace interval; and
- a fourth latch for latching within each pixel of each line trace interval data then appearing at the output of said fourth multiplexer, the data latched in said fourth latch being applied to the second addendum input of said adder for completing a feedback loop conditioning said adder for operation as an accumulator.

10. An interpolator for compressed video data representing every $p^{th}$ pixel in each line of a raster, p being a positive integer, said interpolator comprising:
- an input port for receiving successive lines of compressed video data serially in time;
- a subtractor having a subtrahend input connection, a minuend input connection and a difference output connection;
- means for weighting the compressed video data received at said input port;
- a first latch for latching the data supplied from said means for weighting and providing latched data to the minuend input connection of said subtractor;
- a first multiplexer having a first input connection for receiving a zero-valued datum, having a second input connection for receiving data from the difference output connection of said subtractor, and having an output connection supplying said zero-valued datum during every $p^{th}$ pixel interval in each line trace interval and supplying data received from the difference output connection of said subtractor during intervening pixel intervals of each line trace interval;
- a second latch for latching the data appearing at the output connection of said first multiplexer at selected times and applying them to the subtrahend input connection of said subtractor, said second latch latching the zero-valued datum appearing at said first multiplexer output during every $p^{th}$ pixel interval in each line interval, said second latch latching the data from said subtractor every $(p^{th}+1)$ pixel interval;
- a third latch for latching at p pixel intervals data then appearing at the output of said subtractor;
- an adder having a first addendum input connection for receiving data from said third latch, having a second addendum input connection, and having a sum output connection from which is supplied video data that is de-compressed;
- a second multiplexer having a first input connection for receiving data from the difference output of said subtractor, having a second input connection for receiving data from the sum output of said adder, and having an output connection for selectively supplying the data from the difference output of said subtractor or data from the sum output of said adder; and
- a fourth latch for latching within each pixel of each line trace interval data then appearing at the output of said second multiplexer, the data latched in said fourth latch being applied to the second addendum input of said adder for completing a feedback loop conditioning said adder for operation as an accumulator.

11. An interpolator for expanding video data occurring in successive ordinally number lines wherein at least one even and one odd numbered successive lines of pixel data occur concurrently, said interpolator comprising
- first and second input ports for receiving even and odd numbered lines of ideo data respectively;
- a first multiplexer having a first input connection coupled to said second input port, having a second input connection coupled to said first input port and having an output for supplying data received at one of its input connections responsive to a first multiplexer control signal;
- a second multiplexer having first and second input connections coupled to said second and first input ports respectively, and having an output connection for supplying data received at one of its input connections responsive to a second multiplexer control signal;
- a first subtractor having minuend and subtrahend input connections connected respectively to the output connections of said first and second multiplexers, and having a difference output connection;

a second subtractor having a minuend input connection coupled to the output connection of said first multiplexer, having a subtrahand input connection, and having a difference output connection from which expanded video data is supplied; and weighting means, for weighting values in a prescribed pattern, coupled between the output connection of said first subtractor and the subtrahend input connection of said second subtractor.

12. An interpolator as set forth in claim 11, having in cascade thereafter a further interpolator for increasing the density of video data by p, an integer, comprising:

further weighting means coupled to the output connection of said second subtractor, for at least weighting video data by a factor of 1/p;

a third subtractor having respective minuend, subtrahend and difference output connections;

a first latch coupled between said further weighting means and the minuend input connection of said third subtractor, said latch storing data latched therein for p pixel intervals of video data increased in density by p;

a third multiplexer having a first input connection for receiving a zero-valued datum, having a second input connection coupled to the difference output connection of said third subtractor and having an output connection, said third multiplexer conditioned to alternately couple the zero valued datum and output values from said third subtractor to its output connection;

a second latch coupled between the output connection of said third multiplexer and the subtrahend input connection of said third subtractor, for selectively latching said zero-valued datum and output values from said third subtractor provided by said third multiplexer;

an adder having first and second input connections, and having an output connection for providing expanded video data;

a third latch coupled between the output connection of said third subtractor and the first input connection of said adder, for latching data provided by said third subtractor and storing said data for p pixel intervals;

means, coupled between the output and second input connections of said adder for forming a feedback loop which in combination with said adder forms an accumulator.

13. An interpolator for expanding video data representing every $p^{th}$ pixel in one dimension of a raster, p being a positive integer, said interpolator comprising:

an input port for receiving said video data;
weighting means coupled to said input port for weighting said video data by a factor 1/p;

subtracting means, coupled to said weighting means, for generating differences of successive samples of weighted video data;

a latch coupled to said subtracting means for latching difference values provided by said subtracting means, and providing latched difference values at an output connection thereof, for p pixel intervals of said expanded video data;

accumulator means coupled to said latch for generating successive sum values, said sum values corresponding to expanded video data and said sum values being incremented by the difference value provided by said latch each pixel interval of said expanded video data.

14. The interpolator set forth in claim 13 wherein said subtracting means comprises:

a subtractor having a minuend input connection coupled to said weighting means, having an output connection and a subtrahend input connection;

a multiplexer having first and second input connections coupled respectively to the output connections of said subtractor and a source of a zero-valued datum, for alternately roviding said zero valued datum and difference values provided by said subtractor;

a further latch coupled between the output connection of said multiplexer and the subtrahend input connection of said subtractor, said latch selectively conditioned to latch said zero-valued datum and ones of said difference values provided by said subtractor.

15. The interpolator set forth in claim 14 wherein said accumulator means comprises:

an adder having a first input connection coupled to said latch, having a second input connection and an output connection;

a further multiplexer, having first and second input connections coupled respectively to the output connections of said adder and said subtractor; and a still further latch coupled between the output connection of said further multiplexer and the second input connection of said adder.

16. The interpolator set forth in claim 13 wherein said accumulator means comprises an adder having a first input connection coupled to said latch, and having a second input and an output connections;

a multiplexer having first and second input connections coupled respectively to the output connections of said subtracting means and said adder, and having an output connection;

a further latch coupled between the output connection of said multiplexer and the second input connection of said adder and conditioned to latch a sample every pixel interval of said expanded video data.

* * * * *